Patented July 1, 1924.

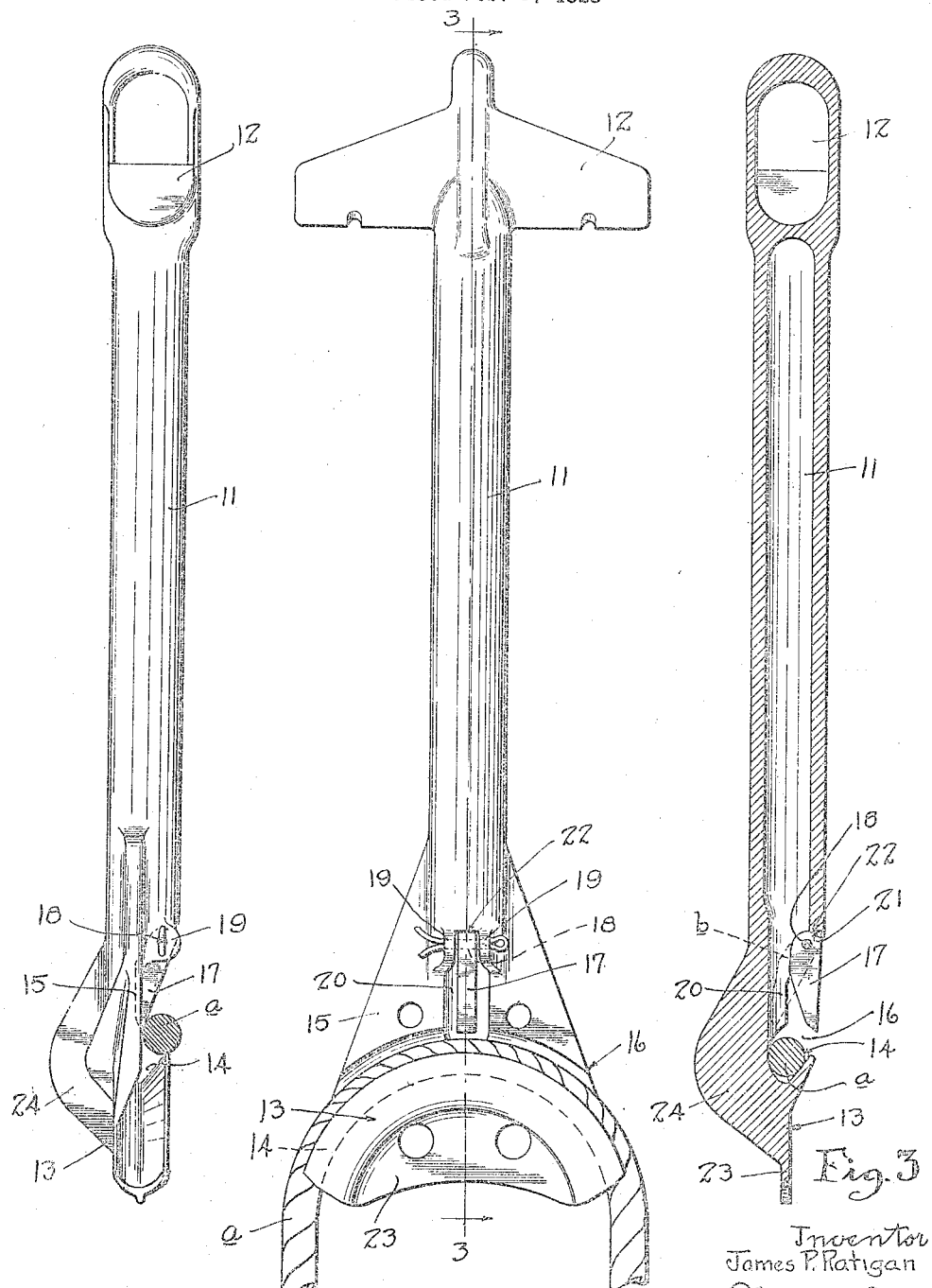

1,499,549

UNITED STATES PATENT OFFICE.

JAMES P. RATIGAN, OF LOS ANGELES, CALIFORNIA.

CROSSHEAD.

Application filed February 8, 1923. Serial No. 617,898.

*To all whom it may concern:*

Be it known that I, JAMES P. RATIGAN, a subject of the King of Great Britain, residing at Los Angeles, in the county of Los Angeles and State of California, have invented a new and useful Crosshead, of which the following is a specification.

This invention relates to cross-heads of the type employed in connecting the walking beam of pumping apparatus to the sucker line, and an object, in general, of the invention is to improve the construction disclosed in United States Letters Patent No. 1,352,627 for pumping apparatus granted to me September 14, 1920.

In using the device disclosed in said former patent, it is necessary to reeve the cable through the groove provided to receive it, since said groove is covered so as to form, in reality, an arcuate eye. A further object of this invention is to make provision for connecting the cable with the cross-head without the necessity of reeving the cable through the eye.

Another object is to make provision for preventing the cable escaping or becoming displaced accidentally from the groove.

Another object is to provide a comparatively simple construction that will accomplish the foregoing desired results.

The accompanying drawings illustrate the invention:

Figure 1 is a side elevation of a cross-head constructed in accordance with the provisions of this invention, a fragment of cable being shown in place in the groove adapted to receive it.

Fig. 2 is an edge view of Figure 1 from the left thereof, the cable being shown in position just entering the groove and engaging and retracting the latch.

Fig. 3 is a longitudinal section on the line indicated by 3—3, Figure 1.

The invention includes a shaft or stem 11 provided at its upper end with a pivoting head 12 and at its lower end with a connection member 13. The pivoting head 12 may be constructed as set forth in the above mentioned patent or in any other suitable manner and the details of its construction need not be given here since such detailed construction constitutes no part of this present invention.

The member 13 is provided with an arcuate groove 14 which preferably narrows toward its bottom so that in cross section the groove is essentially V-shaped. At the junction of the stem 11 and the grooved member 13, said member 13 forms a web 15 which strongly connects the grooved portion of the member 13 with the stem.

The member 13 is provided in one face of the web 13 above the level of the groove with an arcuate slot 16 communicating with the groove 14 and extending from edge to edge of the web 15 so as to permit the passage of the bight of a cable, indicated at *a*, to and from the groove 14 through the slot 16. Thus the web overhangs the groove, thus tending to prevent the cable, when slack, from jumping out of the groove.

Means are provided that will yield to pressure of the cable *a*, in inserting the same through slot 16, and that will function to normally project into the slot 16 to prevent accidental displacement of the cable from the cross-head. In other words such means prevent the cable from escaping through the slot 16. One way of constructing these means is a follows: A latch 17 is movably connected with the stem 11, being pivoted, in this instance, at 18 between two outstanding ears 19 of the stem 11. In this instance the latch 17 is normally held in vertical position, to partially close the opening 16, by gravity. That is to say said latch is free swinging to a limited degree and normally hangs vertically. When the latch is retracted or swung inwardly from the slot 16, as indicated in broken lines *b* in Figure 3, to admit the cable to the groove 14, it is accommodated in a recess 20 in the web 15. Outward swinging of the latch 17 is limited by suitable means as, for example, by reason of its angular upper end 21 engaging a shoulder 22 formed by the upper wall of the recess 20.

The member 13 is forked at its lower end and is strengthened by a web 23 extending along the under side of said member. A central longitudinal rib 24 transverses the rear face of the web 15 and connects with the web 23 and stem 11. The stem 11 may be tubular, as shown.

In practice, the head 12 will be placed transversely of a walking-beam, not shown, the stem 11 being accommodated in the usual slot provided in the free end of the walking-beam. A connection, that is, the cable *a* or functionally analogous member, will be entered through the slot 16, thus swinging inwardly the latch 17 to admit the cable to the groove 14. The cable *a* will have its ends fastened to any suitable clamp, not shown, which clamp is employed for engaging the sucker line of the pump that is to be operated. In the drawings the connection *a* is indicated as being a cable and such cable may be of wire or any other suitable material. However, it is readily understood that such connection may be a chain or a rod suitably bent for the purpose.

After the invention has been installed, as above described, the walking-beam, not shown, will be operated in a manner well understood in the pumping art, thus causing reciprocation of the cross-head. When it is desired to disconnect the connection *a* from the cross-head, it will be apparent that all that is necessary is for the operator to press the latch 17 into the recess 20, thus moving it out of the slot 16, and then lift the cable out of the groove 14 through said slot.

It will be clear from the foregoing that the sucker line can be very quickly connected with and disconnected from the cross-head by the construction disclosed.

I claim:

1. In a cross-head, the combination of a stem, a connecting member having a web joined to one end of the stem and having an arcuate groove adapted to engage a cable, there being a slot in one face of the web extending from edge to edge thereof above the level of the groove and communicating with the groove to admit of the passage of the cable to and from the groove and the web overhanging the groove.

2. In a cross-head, the combination of a stem, a connecting member at one end of the stem having an arcuate groove adapted to engage a cable, there being a slot in the connecting member extending from edge to edge thereof above the level of the groove and communication with the groove to admit of the passage of the cable to and from the groove, and retractable means in the slot to prevent escape of the cable therethrough.

3. In a cross-head, the combination of a stem, a connecting member at one end of the stem having an arcuate groove adapted to engage a cable, there being a slot in the connecting member extending from edge to edge thereof above the level of the groove and communicating with the groove to admit of the passage of the cable to and from the groove, a latch movably connected with the stem and normally positioned to project into the slot to prevent escape of the cable therethrough, there being a recess in the connecting member to accommodate the latch when said latch is swung inwardly from the slot, and means to limit outward swinging of the latch.

Signed at Los Angeles, California, this 29th day of January, 1923.

JAMES P. RATIGAN.